Patented Dec. 25, 1934

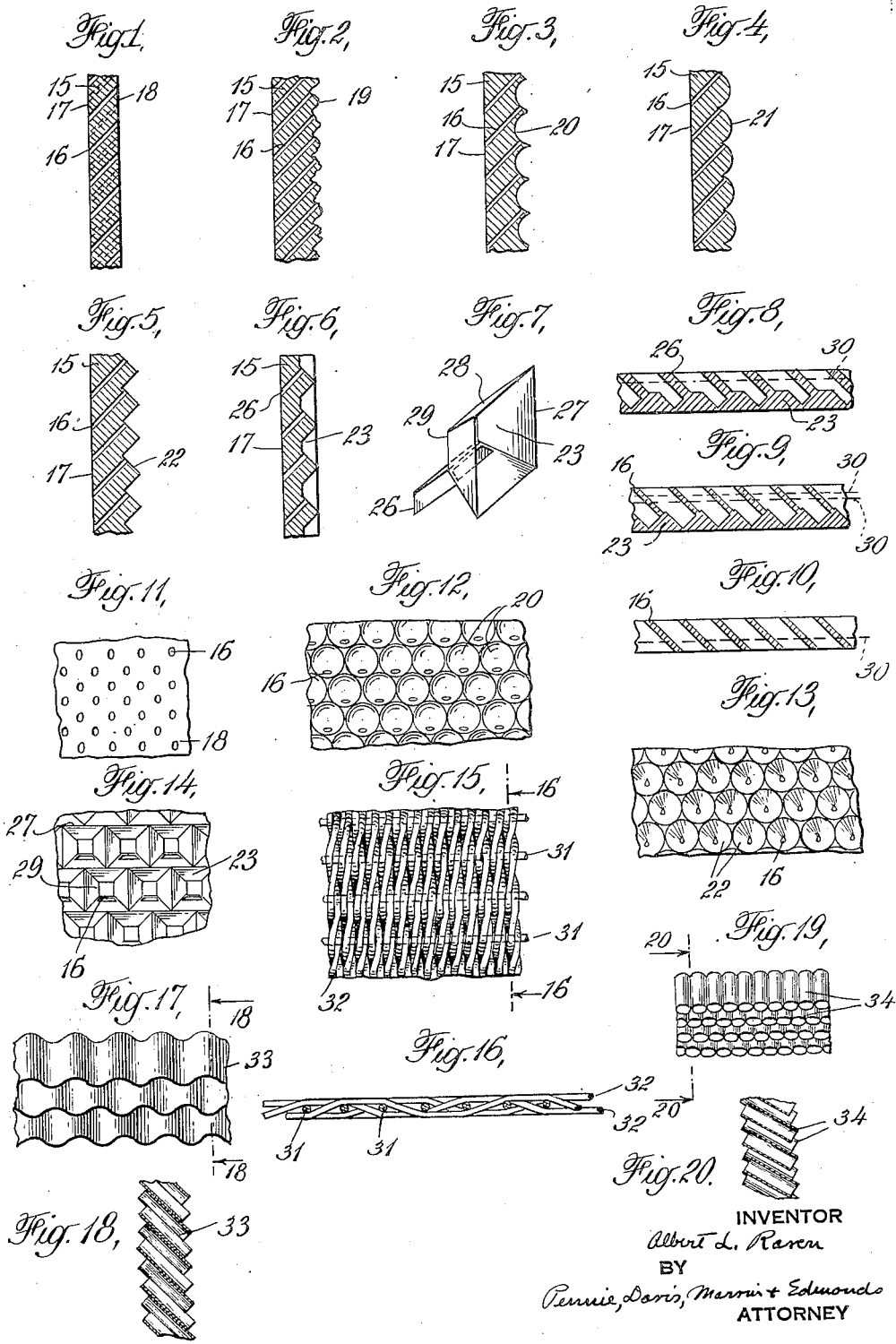

1,985,460

UNITED STATES PATENT OFFICE 1,985,460

MOTION PICTURE SCREEN

Albert L. Raven, Mount Vernon, N. Y.

Application August 25, 1928, Serial No. 302,043

2 Claims. (Cl. 88—24)

This invention relates to moving picture screens and has for its object the provision of certain improvements in moving picture screens. More particularly, the invention aims to provide a screen for motion pictures which will admit of the passage therethrough of sound waves and at the same time present to the spectators a highly reflective and diffusing surface.

In a heretofore customary manner of making reflecting motion picture screens the foundation or base of the screen is composed of some dense material, preferably of such a nature that little, if any, light may be transmitted therethrough, the primary object being to obtain a front surface which will reflect towards the spectators a maximum quantity of light without the production of a glare as would be produced by a mirrored surface. Various means are utilized to obtain this result; one way of obtaining this is disclosed in my prior Patent No. 1,315,743, dated September 9, 1919. Various expedients are used to prevent the reflecting surface of these screens from all lying in the same plane, the object being to obtain a diffusion of the reflected light.

With the advent of talking motion pictures, such for example, as the Vitaphone, it has been found that when large screens are used with the sound producing horn placed at one side of the screen, the voice or music does not appear to emanate from the logical source of the sound, that is, the picture projected on the screen. This effect is particularly noticeable when an actor in a picture is speaking while in a position adjacent to one margin of the picture, while the horn of the Vitaphone is located near the opposite margin of the screen. This effect is not noticeable enough to be disturbing to those seated in the centre of the theatre and at a considerable distance from the screen. It, however, is very pronounced to one sitting at the side of the theatre at a considerable angle to the screen.

In order to overcome this defect it is necessary to replace the usual opaque screen with a porous cloth screen locating the Vitaphone speaker directly behind the screen. The porous nature of the cloth screen permits the passage therethrough of the sound waves and as a consequence the sound appears to emanate from the projected picture upon the screen. This method has the very serious defect that due to the porous translucent nature of the cloth screen a great portion (about 40%) of the light projected thereon passes through the screen and is lost, thus the illumination of the picture is proportionately reduced. In order to compensate for this, it is proposed to increase the candle power of the projection apparatus. This, however, means a substantial increase in the current consumption which substantially increases the cost of operation of a small theatre where the Vitaphone is run continuously with the showing of the picture film. Increasing the candle power of the projection apparatus also increases the danger of burning or damaging the film as it passes through the projection machine. In case the Vitaphone is only used occasionally and it is desired to save current, it would be necessary to use two screens of the type heretofore available.

I have discovered that a motion picture projection screen may be made which will reflect and diffuse a large portion of the projected light and at the same time permit the free passage therethrough of air and like gases and air carried sound waves. In the practice of the invention a foraminous screen is constructed with the perforations or holes passing through the screen at an acute angle to the plane of the screen. It is advantageous to have these holes so disposed that they slant downwardly toward the back of the screen. The disposition of the holes in this manner prevents the direct rays of light from the projection apparatus from passing through the holes in the screen and becoming lost. Holes slanted upwardly toward the back of the screen might be aligned directly with spectators and would consequently appear as minute dots on the surface of the screen.

Another advantage gained by running the holes obliquely downward toward the back of the screen is that the light from the projection apparatus illuminates the entire back of the hole which is visible to the spectators; therefore the total illumination of the screen is reduced but slightly by the presence of the perforations.

In practicing the invention it has been found advantageous to increase somewhat the thickness of the screen to prevent loss of light through the perforations of the foraminous structure of the screen. In case the body of the screen is made of material which has poor reflecting qualities and in which the reflecting surface comprises a specially compounded film or coating, it has been found advantageous to form the perforations prior to the application of the reflecting film. This procedure permits the reflecting film to be applied to the exposed surface of the holes in a manner similar to its application to the surface of the screen.

Frequently, a reflecting motion picture screen has upon its surface impressions or protuberances which are designed to diffuse the reflected light. Where features of this nature are present, it is advantageous to have the forward or upper end of the holes appear at the surface of the screen on the upper portion of convex surfaces and in the lower portion of concave surfaces. This type of construction aids in obscuring the holes from the vision of the spectators, for these particular portions of curved surfaces are more obscured from the eyes of the spectators than are vertical plane surfaces or the upper portions of concave surfaces, or the lower portions of convex surfaces. This is due to the fact that with most of the motion picture screens the line of vision is at least slightly upward as the projected picture is being watched.

The holes or perforations through the screen may be of any desired shape or form, but they should preferably be slanted downward toward the back of the screen. I have discovered that it is advantageous, particularly from an acoustic standpoint to have the openings terminate on the spectator side of the screen in a somewhat flaring opening. This type of construction permits each individual opening to act in the nature of a miniature megaphone. At the same time, this construction permits the communicating hole to terminate on the front of the screen on the lower side of a concave indenture in the screen surface or on the upper side of a convex protuberance. These indentures or protuberances on the front of the screen assist in diffusing the reflected light and consequently aid materially in reducing the glare of the screen.

Wire mesh fabric of certain specialized weaves make very advantageous sound transmitting and light reflecting screens. A particularly advantageous wire weaving has the weft or woof wires so bent that as they cross the warp wires adjacent pairs of weft wires are substantially juxtaposed. This manner of weaving permits substantially no direct passages through the fabric and at the same time admits sound waves to permeate the fabric with but one directional change and emanate from the fabric within miniature megaphone-like openings which are directional in effect. The material of which the wires are made may be of a highly reflecting nature so that a large portion of the projected light is reflected and due to the nature of the reflecting surface is well diffused.

The practical operation and construction of a motion picture screen embodying the aforementioned principles underlying the present invention will be understood from the following description, taken in conjunction with the accompanying drawing, the various views of which are greatly enlarged to depict more clearly the screen structure; in which, Figs. 1 to 6 and 16, 18 and 20 are sectional views through screens made in accordance with the invention;

Fig. 7 is a perspertive view of one of the indentures and communicating holes used in the screen illustrated in Fig. 6;

Figs. 8, 9 and 10 are sectional views through moulds used in forming various modifications of the screens;

Figs. 11 to 15, 17 and 19 are front views of various modifications of the screens of the invention;

Fig. 17 is a side view of a fragment of a screen made in accordance with a further modification, Fig. 18 is a section taken on line 18—18 of Fig. 17.

Fig. 19 is a view similar to Fig. 17 of a still further modification, and

Fig. 20 is a section taken on line 20—20 of Fig. 19.

The screen illustrated in Fig. 1 comprises a body 15, of any appropriate material. The front surface 18, which is presented to the spectators, may be slightly roughened in any desired manner to give better diffusion of the reflected light. Thus the screen may be made as described in my prior patent above referred to. The body 15 of the screen is pierced by holes or perforations 16, which preferably slant downwardly from the front 18 of the screen toward the back 17. Thus, the holes which appear on the surface of the screen do not appear to the spectator as black dots with no illumination. The source of light from the projection machine illuminates the back portion of the hole and a large proportion of this light is reflected out toward the spectators thus reducing the visibility of the sound holes. Only a minor portion of reflected light finds its way through the slanting holes 16 and emerges at the back 17 of the screen. Preferably, the holes 16 should have their front orifices higher than the rear orifices. Although in order to meet certain conditions, this relationship of the orifices may be reversed. It is desirable that under no conditions should the axes of the holes correspond with the direction of the projected light.

The screen illustrated in Fig. 2 comprises a body 15 of any appropriate material. The front surface 19 of the screen is irregularly corrugated so that the surface 19 which is presented to the spectators is appreciably roughened. The body 15 of the screen is pierced by holes 16 which slant downwardly from the front surface 19 of the screen toward the back 17 of the screen. The holes 16 are placed in such manner that their upper orifices on the front of the screen appear preferably upon the upper surface of the corrugations with which the front of the screen is covered. The placing of the front orifices in this relationship to the corrugations on the front of the screen reduces the size of the orifice which is visible to the majority of the spectators who are normally in a position lower than the screen itself. The portion of the orifices which is exposed to the spectators is illuminated from the projection machine as brightly as any other portion of the screen. Consequently, the presence of the holes does not lessen the illumination of the screen.

The screen illustrated in Fig. 3 comprises a body 15 of any appropriate material. The front of the screen is substantially filled with indentures 20 which may be regarded as spherical segments adjoining one another or closely approaching each other. The body 15 of the screen is pierced by holes 16 which have their forward ends located in the lower portion of the concave indentures 20 appearing upon the surface and slant downwardly therefrom toward the back 17 of the screen. By having the holes 16 appear upon the surface of the screen in the lower portion of the concave surface a minimum of the holes 16 is visible to the spectators, and aside from this, the concave indentures 20 act in the nature of a megaphone or sounding box for sound waves which may be transmitted through the holes from the back of the screen.

The screen illustrated in Fig. 4 comprises a body 15 of any appropriate material, the front surface of which is substantially covered by convex spherical segments 21 which aid in diffusing the light which is reflected from the surface of the screen. The screen is pierced by holes 16 which have their front openings in the upper portion of the convex spherical segments 21 appearing on the surface of the screen. From thence the holes 16 slant downwardly toward the back 17 of the screen. The positioning of the holes 16 in this manner reduces the exposure of the holes visible to the spectators and at the same time sound waves emanating from the back of the screen and carried therethrough by the holes 16 are directed toward the spectators by the flaring openings at the front part of the screen. This megaphone or sound box effect is produced by the flaring sides of the two adjoining spherical segments.

The screen illustrated in Fig. 5 comprises a body of any appropriate material, the front surface of which is substantially covered with minute cone-shaped indentures 22. From a point near the tip or apex of these cone-shaped indentures 22 the holes 16 slant downwardly toward the back 17 of the screen. The minute cone-shaped indentures 22 act as megaphones or sounding boxes for sound waves emanating from the back of the screen and carried therethrough by the holes 16. Thus, the sound carried through the screen is directed toward the spectators as it emerges from the screen on the front or spectator side.

The screen illustrated in Fig. 6 comprises a body 15 of any appropriate material, the front surface of which is substantially covered with depressions 23 in the form of square base pyramids, each of these depressions terminating in a square plane surface parallel to the face of the screen and smaller than the opening on the surface of the screen. From the lower side of the depressions 23 the slotted holes 26 slant downwardly toward the back 17 of the screen. The slotted holes 26 are visible to the spectators near the apex of the pyramid and adjoining the small square plane surface but their apparent size is reduced due to the slope of the lower surface. Sound waves emanating from the back of the screen are carried through the slotted holes 26 and are directionally thrown out toward the spectators by the megaphone effect of the depressions 23. By causing the slotted holes 26 to terminate in the lower side of the pyramid, less of the opening is visible to the majority of the spectators who are normally seated at a lower level than the screen itself.

The individual depressions illustrated in Fig. 7 comprise the square forward opening 27 from which the pyramid sides 28 converge toward the back 29 of the depression. The back 29 of the depression comprises a smaller plane square surface parallel to the square opening 27 and the face of the screen. From the lower side of the pyramid and adjacent to the back 28, the slot-like opening 26 extends downwardly toward the back 17 of the screen.

This type of depression admits of thorough diffusion of the light and unusual illumination, due partially to the relatively large plane surfaces which are reflecting the light. Sound emanating from the back of the screen is carried through the slot-like opening 26 to the depression 23. The depression 23 acts in the nature of a megaphone or sound box directionally throwing out toward the spectators the sound carried from the back of the screen.

The mold illustrated in Fig. 8 comprises a mold for forming screens as illustrated in Figs. 6 and 7, the material of which the mold is made has been removed in any appropriate manner, such for instance, as by means of a milling tool, so that the individual depressions 23 and the slotted openings 26 are left standing as raised portions within the mold. The material of which the screen is composed, such for instance, as rubber or a suitable plastic, is appropriately placed within the mold and permitted to set. After the material has acquired the desired set, it is removed from the mold and presents the appearance illustrated in cross-section in Fig. 6.

With certain compositions of molding material, it is desirable to reinforce the molded material with a reinforcing substance in the nature of a textile fabric, wire cloth, or straight reinforcing mediums 30. These reinforcing mediums 30 are forced down over the openings 26, so that when the plastic or liquid material is placed in the mold the reinforcing material is thoroughly embodied in the material of the screen and does not interfere in any way with the openings 26 or the depressions 23. The material of which the screen is composed entirely fills the available space in the mold up to the top of the openings 26, but not beyond this point, for it is desirable and necessary to have the openings 26 appear in the finished screen as holes or perforations.

The mold illustrated in Fig. 9 comprises the cone-shaped depressions 23 and the holes 16, which in the form of a mold appear as solid material. Reinforcing material 30 may be suitably placed within the mold and around the openings 16. When the material of which the screen is made is removed from the mold, the depressions 23 appear upon the surface of the screen and the holes 16 extend to the back of the screen.

The mold illustrated in Fig. 10 comprises the holes 16 which are present in the mold in the form of solid rods or bars extending from the face of the mold to the upper portion. The material of the screen is placed in a suitable manner in the mold and permitted to set. Suitable reinforcing material 30 may be disposed within the mold so as to be present in the body of the screen. When the molded material is removed from the mold, the holes 16 appear in the screen running entirely through the screen slanting downwardly from the front toward the back of the screen.

The screen illustrated in Fig. 11 is a front view of the screen shown in Fig. 1 in which the round holes 16 appear upon the surface as oval or elliptical openings.

The screen illustrated in Fig. 12 is a front view of the screen illustrated in Fig. 3 in which the depressions 20 appear as circles and the openings 16 appear as laterally extending ovals.

The screen illustrated in Fig. 13 is a front view of the screen shown in Fig. 5 in which the cone-shaped depressions 22 appear as circles and the openings 16 appear as pear-shaped openings.

The screen illustrated in Fig. 14 is a front view of the screen illustrated in Fig. 6. The pyramid depressions 23 appear as square openings 27 with the back of the pyramid appearing as the smaller squares 29. The slotted openings 16 appear as rectangles located adjacent to and below the square 29 at the back of the depression.

The screens illustrated in Figs. 15 and 16 comprise the warp wires 31 and the weft or woof wires 32 of a woven screen. The weave of the screen illustrated is such that the warp wires 31 are substantially straight and parallel to each other. The weft wires 32, however, are bent in a zig-zag manner as they cross over and under adjacent pairs of the warp wires 31. As the warp wire appears on the surface of the screen, it is bent over the adjacent warp wire which is disappearing from the surface. Thus, the two wires have the appearance of being twisted around each other when in reality each wire is but bent in a zig-zag manner so that they may be juxtaposed, during at least a portion of their length.

The screen illustrated in Figs. 17 and 18 is made up of corrugated strips 33 superimposed ridge to ridge with each succeeding strip overlapping the previous strip. The strips are disposed so that the plane of the strip is oblique to the plane of the surface of the screen.

In a screen made up in the manner just described either side of the screen may be used as the front or reflecting surface depending largely upon whether it is desirable to have the sound waves projected downwardly or upwardly as they leave the front of the screen. The question of whether the sound transmitting openings shall slant upwardly or downwardly depends also largely upon the design of the theatre in which the screen is to be used. The deciding factors are the distance of the screen from the spectators and the relative position of the projection apparatus, screen and spectators.

The corrugated surfaces of the strips make advantageous light diffusing mediums because of the curved surfaces of the corrugated strips. The sloping disposition of the strips precludes the direct passage of light through the screen and the openings formed by the corrugations present a very large area for the passage of sound through the screen.

The corrugated strips may be made of various materials including metals and metallic alloys. Textile fabrics appropriately stiffened are also advantageous and the various pulp products, such for example as paper and cardboard, various other plastics and molding compounds are also advantageous in forming the corrugated strips.

If it is desirable to have the strips closer together they may be joined at any place on the slope of the ridges so that they will be in fixed spaced relation to one another. This method of joining will proportionately reduce the available sound transmitting passages through the screen but may prove advantageous in reducing the quantity of light lost in these passages.

Fig. 18 is a sectional view on the line 18—18 of Figure 17 and depicts more readily the overlapping of the joined corrugated strips. These strips may be held adjacent to each other in any appropriate manner as by soldering, welding or by means of appropriate adhesives or depending from appropriate supports.

The screen illustrated in Figs. 19 and 20 is built in substantially the same manner as that illustrated in Figs. 17 and 18. Short hollow tubes 34 take the place of the corrugated rows of the other figures. The strips of tubes overlap adjacent rows of tubes in substantially the same manner as the corrugated strips overlap.

The tubes 34 are set obliquely to the plane of the screen and the hollow interior of the tubes transmit the sound through the screen. Substantially the same latitude of construction material is available as was the case with the corrugated strips and the tubes may be joined in substantially the same manner. The length of the tubes depends almost wholly on the interior diameter of the tubes for they must be long enough to inhibit the passage therethrough of direct rays of light from the projection apparatus.

The screen of Figs. 1 to 14 inclusive, may be made of a wide range of materials. Under certain conditions of molding and removing from the mold, it is advantageous to make use of a material which will be somewhat flexible, after it has attained its original set. Materials in the nature of rubber compositions are available for this type of screen, as well as certain plastic compositions composed chiefly of nitro-cellulose, or cellulose acetate, gelatine and the like, combined with suitable fillers. Linoxolin, pyroxylin and the like combined with suitable fillers may also be found advantageous in constructing this type of screen. In fact, any plastic material which remains more or less flexible after it has set, is found useful in molding screens of this nature.

It is not necessary although it may be desirable, that the material of the body of the screen shall be of a light colored nature, for the surface of the screen after it is formed may be painted with a suitable coating of light reflecting material, such for instance, as aluminum paint, the customary white paint and the like. These coatings, however, are not so desirable as a screen in which the body itself is composed of a good light reflecting medium, and it is usually found advantageous to construct the body of the screen of this type of material.

The reinforcing material which is placed within the body of the screen itself may comprise a great variety of material, such for instance, as textile fabrics in the nature of cheesecloth and mosquito netting. Wire fabrics in the nature of woven wire materials have also been found desirable in reinforcing screens made in accordance with the invention. It is sometimes desirable to reinforce the screen with straight pieces of fabric or wire, which are laid within the body of the mold and around which the molding material is forced.

Screens made in accordance with the present invention may also comprise rigid materials in the nature of ordinary white plaster, plaster of Paris, or blocks composed of magnesium oxide, carbonate or the like. When a screen is composed of these rigid materials, it is frequently desirable to place the communicating sound carrying holes and light reflecting depressions in the screen after the screen has been assembled or after the individual blocks have been formed. It is advantageous in forming the rigid type of screen to make the plaster or magnesium blocks individually in squares or inter-locking blocks of suitable size. These blocks are then placed upon an appropriate backing, such as tightly stretched wire netting and suitably attached to the netting. The blocks may be attached to the netting in any suitable manner either by adhesives or plastics or they may be mechanically attached to the reinforcing wire netting. As the blocks are placed together a suitable bonding material is placed in the joints and the surface of the screen later appropriately smoothed so that the bonding joints do not appreciably impair the reflection of light from the surface of the screen and are not visible to the spectators.

Screens comprising magnesia blocks or the like diffuse the light sufficiently from the plane surface so that it is consequently not necessary to make depressions in the surface of the screen.

The communicating holes are mechanically bored or drilled through the blocks and the screen appears as a plain white surface of reflecting material filled with a myriad of small holes communicating with the back of the screen. The back surface of these holes since they comprise the same material as the screen itself, reflect and diffuse the light in a satisfactory manner.

Angular or similar depressions may be made in the surface of the screen if it is desirable from an acoustic standpoint communicating at their apexes with the holes which transmit the sound from the back of the screen. These depressions in this type of material do not interfere with the diffusion of light, but rather assist in this diffusion. Since the flaring sides of the depressions aid in directing the sound which may be carried through the openings, it is frequently desirable to form the surface of the screen with these depressions.

It is frequently desirable to form motion picture screens of such material that they will withstand excessively hard usage and still permit of no damage to the reflecting surface of the screen. This type of screen is particularly desirable when a portable screen is found necessary. Such a screen may comprise a woven wire cloth of such construction that the wires appearing on the front of the screen comprise almost a continuous surface of wire. In forming this type of wire fabric, the weft wires of the screen are laid substantially adjacent one another, and the warp wires are placed at a considerable distance from each other. The weft wires due to their greater diameter and the form of weaving are the only wires which are exposed on the surface of the screen. In making screens of this nature, the weft wires are composed of a highly light reflecting metallic substance, such as aluminum or its alloys, nickel and the like. A screen composed in this manner is highly reflective and at the same time diffuses the light very effectively. Sound waves may be transmitted from the back through the interstices of the wire mesh material, and due to the structure of the screen are directionally impelled as they emerge on the surface of the screen, but substantially all of the light impinging upon the front side of the screen is reflected back toward the spectators and effectively diffused. The interstices through the wire mesh material of this nature terminate on the spectator side of the screen in each case in a miniature megaphone formation, so that sound waves transmitted with only one directional change through the screen from the back toward the front are directed toward the spectators as the waves emanate from the individual sound boxes.

It is understood that I do not wish to confine myself to the particular screens illustrated and described in this specification. These are given merely by way of example of the invention which resides more particularly in a foraminous structure which reflects and diffuses projected light and at the same time permits sound waves to be transmitted therethrough. These sound waves as they emerge at the front of the screen are directed toward the spectators due to the sound box or megaphone structure of the openings on the spectator side of the screen. The openings appearing on the surface of the screen also are of such a nature or so positioned in reference to surface features of the screen, that the apparent opening visible to the spectators is smaller than the actual opening.

I claim:

1. A screen for the projection of pictures accompanied by sound comprising an assemblage of short tubes arranged in contact with one another in rows obliquely to the plane of the screen, each row of tubes overlapping its adjacent rows, the rear surfaces of the interior of the tubes forming a part of the reflecting surface of the screen.

2. A screen for the projection of pictures accompanied by sound comprising a plurality of rows of tubes arranged in overlapping relation, and means connecting said tubes to provide a foraminous screen panel which will resist the passage of light, the rear surfaces of the interior of the tubes forming a part of the reflecting surface of the screen.

ALBERT L. RAVEN.

CERTIFICATE OF CORRECTION.

Patent No. 1,985,460.   December 25, 1934.

ALBERT L. RAVEN

It is hereby certified that error appears in the printed specification of the above numbered patent requiring correction as follows: Page 2, first column, line 64, for "perspertive" read perspective; page 4, first column, line 66, for "rows" read strips; and line 67, for "strips" read rows; and that the said Letters Patent should be read with these corrections therein that the same may conform to the record of the case in the Patent Office.

Signed and sealed this 12th day of February, A. D. 1935.

(Seal)

Leslie Frazer
Acting Commissioner of Patents.